US008099852B2

(12) United States Patent
Lo

(10) Patent No.: US 8,099,852 B2
(45) Date of Patent: Jan. 24, 2012

(54) METHOD FOR ASSEMBLING IMAGE CAPTURING DEVICE

(75) Inventor: Jui-Hsiang Lo, Taipei (TW)

(73) Assignee: Primax Electronics Ltd., Taipei (TW)

( * ) Notice: Subject to any disclaimer, the term of this patent is extended or adjusted under 35 U.S.C. 154(b) by 357 days.

(21) Appl. No.: 12/399,578

(22) Filed: Mar. 6, 2009

(65) Prior Publication Data

US 2010/0170082 A1 Jul. 8, 2010

(30) Foreign Application Priority Data

Jan. 5, 2009 (TW) .............................. 98100017 A

(51) Int. Cl.
*G01R 31/28* (2006.01)
(52) U.S. Cl. ............... 29/593; 29/831; 29/833; 29/846; 29/877; 324/202; 324/210; 324/212; 324/260; 324/261
(58) Field of Classification Search .............. 29/592.1, 29/593, 831, 833, 846, 877, 721; 324/202, 324/210, 212, 260, 261
See application file for complete search history.

(56) References Cited

U.S. PATENT DOCUMENTS 6,215,406 B1 * 4/2001 Chen ............................. 340/632
2005/0036778 A1 * 2/2005 DeMonte ...................... 396/89

FOREIGN PATENT DOCUMENTS

JP 2005316127 A * 11/2005

* cited by examiner

*Primary Examiner* — Paul D Kim
(74) *Attorney, Agent, or Firm* — Kirton & McConkie; Evan R. Witt

(57) ABSTRACT

A method for assembling an image capturing device is provided. The image capturing device includes a light-pervious module, an image sensor and a binding material. The image sensor has a light sensing region for converting an imaging light into an electronic signal. The binding material is used for binding articles together and curable by a curing process. Firstly, the light-pervious module and the image sensor together are releasably bound together via the binding material, thereby defining a close space for accommodating the image sensor. Then, a testing process is performed to detect a clean condition of the close space. If particles present in the close space are detected, the light-pervious module is detached from the image sensor, a cleaning process is done to remove the particle, and the light-pervious module and the image sensor are releasably bound together to define the close space again. Afterwards, the binding material is cured.

7 Claims, 6 Drawing Sheets

METHOD FOR ASSEMBLING IMAGE CAPTURING DEVICE

FIELD OF THE INVENTION

The present invention relates to a method for assembling an image capturing device, and more particularly to a method for assembling an image capturing device in order for reducing the damage rate, reducing the fabricating cost and increasing the throughput.

BACKGROUND OF THE INVENTION

Nowadays, personal communication devices have experienced great growth and are now rapidly gaining in popularity. The personal communication devices having image capturing devices are gradually marketable. The common image capturing devices are for example cameras or video cameras. When the image capturing devices are used in mobile phones, personal digital assistant (PDA) or notebook computers for video recording, video calling, video conferencing or other network applications, the convenience and the diversity of these image capturing devices are evident. Generally, such an image capturing device principally comprises a lens module, a lens mount, an image sensor and a printed circuit board (PCB). The image sensor such as a CCD (charge coupled device) chip or a CMOS (complementary metal-oxide semiconductor) chip is disposed on the printed circuit board. For assembling the image capturing device, the image sensor is firstly fixed on the printed circuit board, the lens module is then mounted on the lens mount, and the lens mount is finally glued on the printed circuit board. During the process of producing, transporting or assembling the image capturing device, some particles, dust or dirt may be brought into the lens module or the image sensor. Under this circumstance, the image quality of the image capturing device is deteriorated.

Conventionally, after the image capturing device has been assembled, a testing process is performed to detect whether there is any particle, dust or dirt present in the lens module or the image sensor. If any particle, dust or dirt is detected, the lens module needs to be detached from the printed circuit board in order to remove the particle, dust or dirt. Since the lens module has been fixed on the printed circuit board, the process of detaching the lens module from the printed circuit board may easily result in damage of lens module and even cause considerable economic loss. A related discussion is described in for example Taiwanese Utility Model Patent No. 283188, entitled "Assembling structure of lens module". If there is a stain on the image sensor after the lens module has been glued on the printed circuit board, the lens module needs to be detached from the printed circuit board. This lead to damage of the lens module and thus the lens module fail to be used again. Under this circumstance, the manufacturing cost is increased.

Therefore, there is a need of providing an improved method for assembling an image capturing device so as to obviate the drawbacks encountered from the prior art.

SUMMARY OF THE INVENTION

In accordance with an aspect of the present invention, there is provided a method for assembling an image capturing device. The image capturing device includes a light-pervious module, an image sensor and a binding material. The image sensor has a light sensing region for converting an imaging light into an electronic signal. The binding material is used for binding articles together and curable by a curing process. Firstly, the light-pervious module and the image sensor together are releasably bound together via the binding material, thereby defining a close space for accommodating the light sensing region of the image sensor. Then, a testing process is performed to detect a clean condition of the close space. If particles present in the close space are detected, the light-pervious module is detached from the image sensor, a cleaning process is done to remove the particle, and the light-pervious module and the image sensor are releasably bound together to define the close space again. Afterwards, the curing process is performed to cure the binding material.

In accordance with another aspect of the present invention, there is provided a method for packaging an image sensor. Firstly, an image sensor and a package structure are releasably bound together via a binding material, wherein the binding material is curable by a curing process. Then, a testing process is performed to detect whether there are particles on the package structure. If particles are detected, the image sensor is detached from the package structure, a cleaning process is done to remove the particle, and the image sensor and the package structure are releasably bound together again. Afterwards, the curing process is performed to cure the binding material.

In accordance with a further aspect of the present invention, there is provided a method for assembling a camera module. The camera module includes an image sensor and a lens module. Firstly, the image sensor and the lens module are releasably bound together via a fixing adhesive, wherein the fixing adhesive is curable by a curing process. Then, a testing process is performed to detect whether there are particles present between the image sensor and the lens module. If no particles are present between the image sensor and the lens module, the fixing adhesive is cured.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
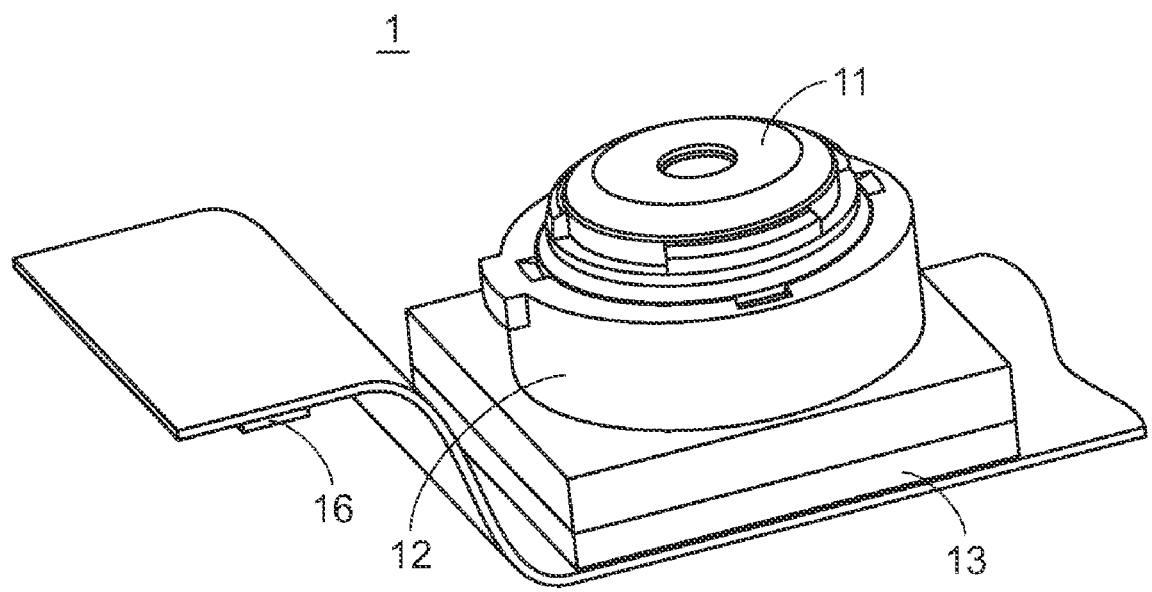
FIG. 1A is a schematic perspective view illustrating an image capturing device according to an embodiment of the present invention.
Figure 1B:
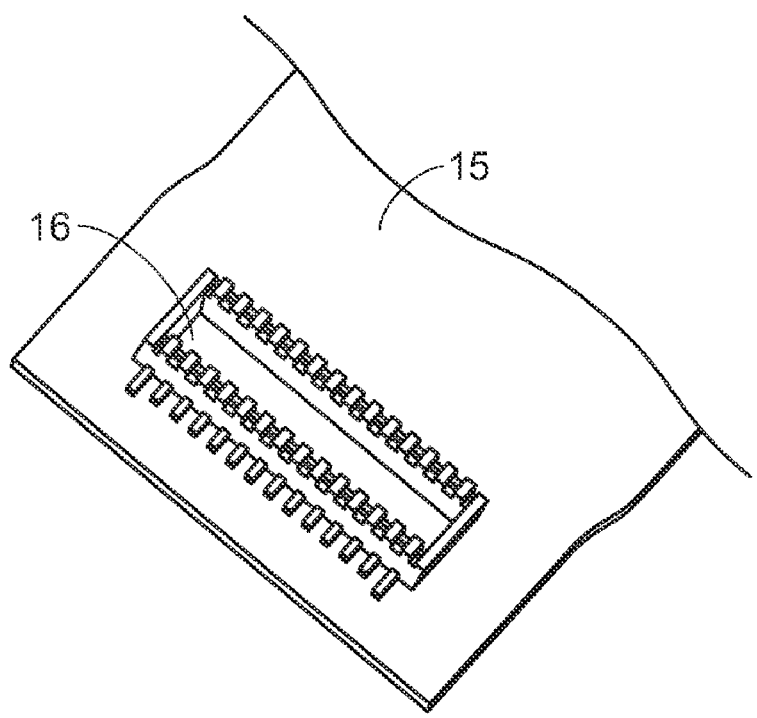
FIG. 1B is a schematic partially perspective view illustrating a flexible printed circuit board and an external socket for electrically connecting the image capturing device with the external circuitry according to an embodiment of the present invention.
Figure 2:
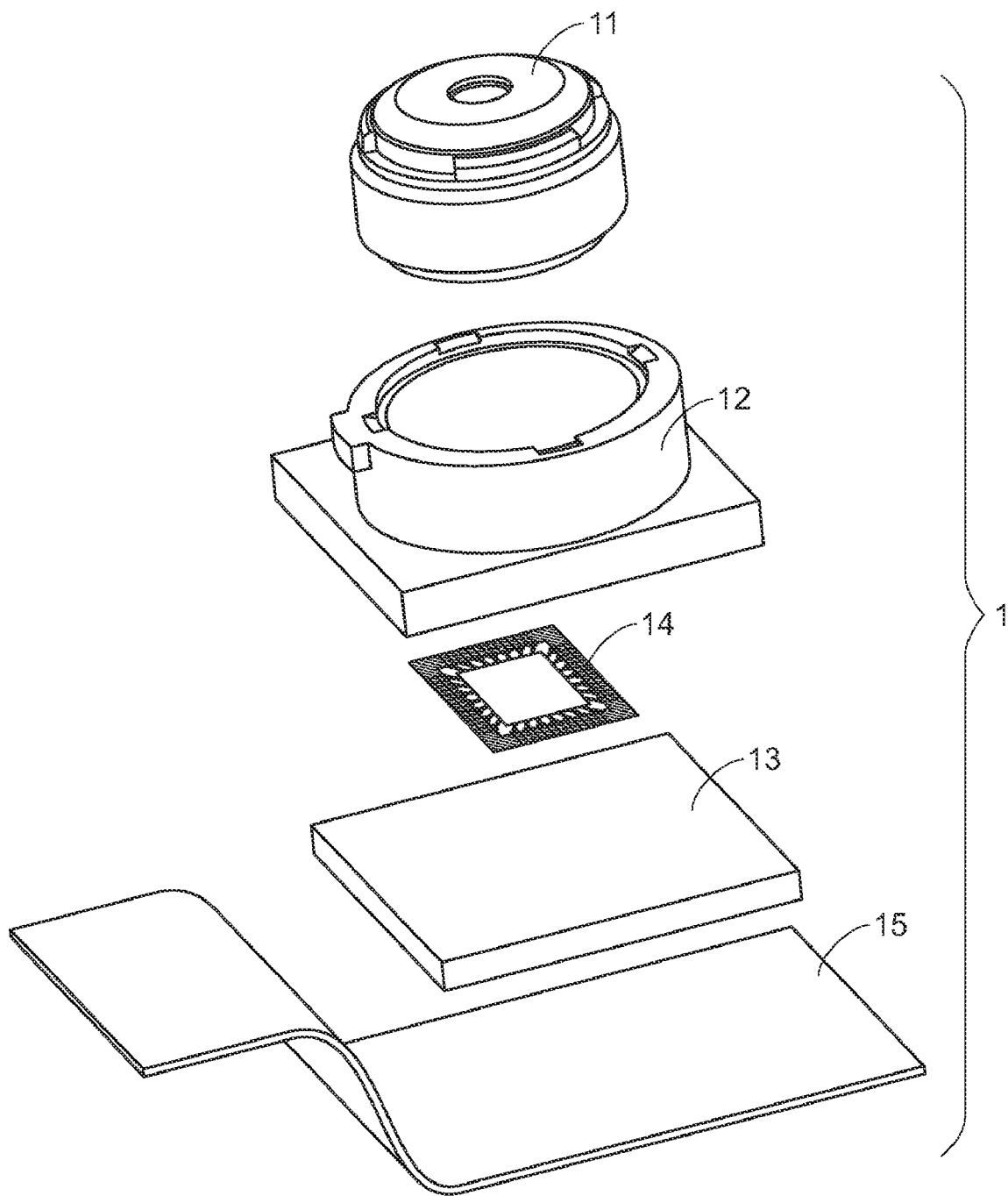
FIG. 2 is a schematic exploded view of the image capturing device shown in FIG. 1A.
Figure 3:
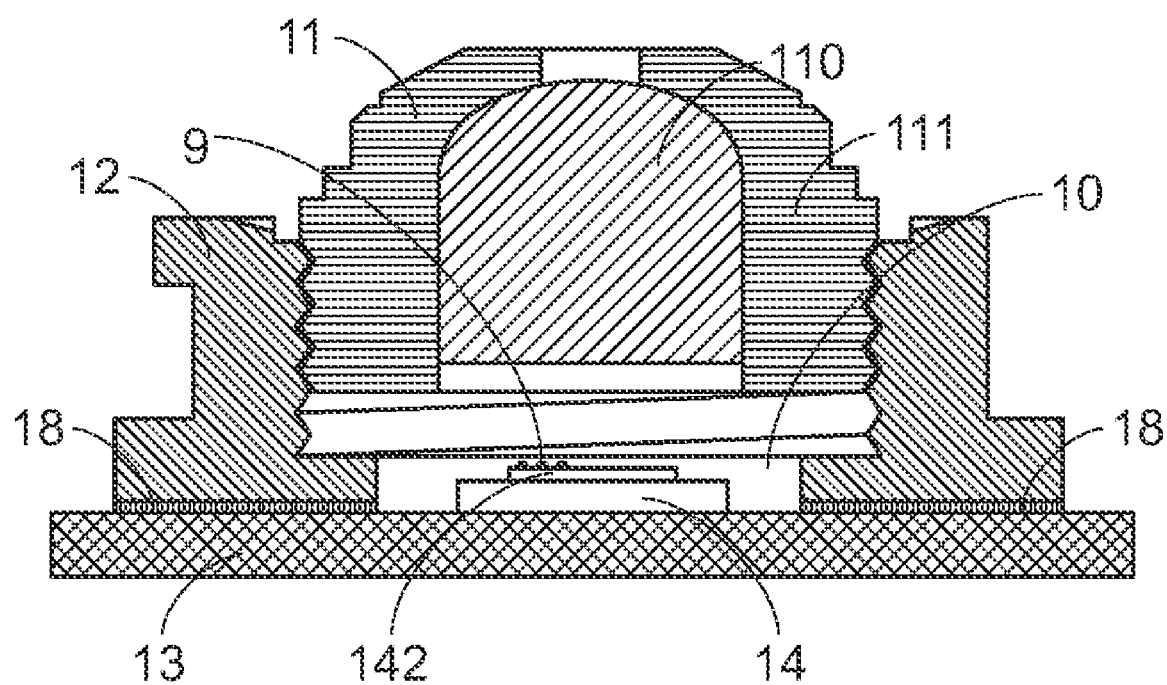
FIG. 3 is a schematic cross-sectional view of the image capturing device shown in FIG. 1A.

FIG. 1A is a schematic perspective view illustrating an image capturing device according to a first embodiment of the present invention. FIG. 2 is a schematic exploded view of the image capturing device shown in FIG. 1A. FIG. 3 is a schematic cross-sectional view of the image capturing device shown in FIG. 1A. Please refer to FIGS. 1A, 2 and 3. The image capturing device 1 principally comprises a lens module 11, a lens mount 12, a printed circuit board 13 and an image sensor 14. The lens module 11 comprises a lens barrel 111 and a lens (or a lens set) 110 mounted within the lens barrel 111. The lens mount 12 includes a cylindrical sleeve and a square pedestal. The lens barrel 111 of the lens module 11 has a thread structure formed on the outer surface thereof. The cylindrical sleeve of the lens mount 12 has a thread groove formed on the inner surface thereof. The thread structure of the lens barrel 111 mates with the thread groove of the lens mount 12 such that the lens module 11 can be moved upwardly or downwardly with respect of the lens mount 12 upon rotation of the lens module 11. An exemplary image sensor 14 includes a CCD chip or a CMOS chip. The image sensor 14 has a light sensing region 142 in the center thereof. The light sensing region 142 is used for receiving a light beam and converting the light beam into an electronic signal indicative of an image. In addition, multiple electrical contacts 141 are formed on the periphery of the image sensor 14 and connected with the circuitry in the light sensing region 142. The image sensor 14 is mounted on the printed circuit board 13. The electrical contacts 141 on the periphery of the image sensor 14 are connected with the circuitry (not shown) of the printed circuit board 13 via a wire binding process. For facilitating operating the image capturing device 1, the printed circuit board 13 may be further connected to an external socket or other electronic connectors. As shown in FIGS. 1A and 1B, the printed circuit board 13 may be electrically connected with an external socket 16 via the trace pattern (not shown) of a flexible printed circuit board 15. When a corresponding plug is coupled with the socket 16, the image capturing device 1 can be controlled by an external circuitry, or the electronic signal of the captured image can be transmitted to the external circuitry. In some embodiments, the external circuitry indicates a control circuit or an image storage medium of a portable electronic device.

Please refer to FIG. 3 again. The lens mount 12 and the printed circuit board 13 are releasably bound together via a binding material 18. The binding material 18 has both fluidity and stickiness. In accordance with a key feature of the present invention, after the binding material 18 is applied onto a surface of an adherent, the stickiness of the binding material 18 is sufficient to combine an article onto the surface of the adherent. In other words, after the binding material 18 is applied onto the surface of the printed circuit board 13, the lens mount 12 and the printed circuit board 13 are releasably bound together due to the stickiness of the binding material 18. Next, a curing process is performed to eliminate the fluidity of the binding material 18, so that the lens mount 12 is firmly fixed onto the printed circuit board 13. Depending on the type of the adhesive, the adhering medium or the fixing glue, the curing process is varied. For example, in a case that a thermal cure adhesive is used, the curing process is a heating process. Depending on the type of the thermal cure adhesive or some practical factors, the heating process or the heating condition may be varied or adjusted by those skilled in the art. In another case that a light curable adhesive such as an ultraviolet curable adhesive (or UV adhesive) is used, the curing process is performed by irradiating the adhesive layer with appropriate light according to the type of the light curable adhesive. Moreover, in another case that an anaerobic adhesive is used, the curing process is performed by curing the anaerobic adhesive in the absence of air for a certain time period. The mixture of two or more different adhesive systems may be used and the curing process needs to be modified according to the adhesive systems.

After the lens mount 12 and the printed circuit board 13 are releasably bound together, the lens set 111 of the lens module 11 is focused onto the image sensor 14 and thus the image capturing device 1 can be used to capture an image and convert the image into an electronic signal. At this moment, a close space 10 is defined by the lens module 11, the lens mount 12 and the printed circuit board 13. In particular, the light sensing region 142 of the image sensor 14 is packaged in the close space 10. As known, if some particles 9 are present in the close space 10 and hinder the optical path of the imaging light, the image quality of the image capturing device is deteriorated. The particles 9 include for example foreign dust or dirt or the crumbs resulted from friction between the components of the image capturing device 1. For enhancing the product yield, the particles 9 need to be removed.

Since the particles 9 are present in the close space 10, it is necessary to detach the lens mount 12 from the printed circuit board 13 although the lens mount 12 and the printed circuit board 13 are releasably bound together via the binding material 18. As previously described in the conventional assembling method, the binding material 18 has been cured after the particles 9 are detected. The action of detaching the lens mount 12 from the printed circuit board 13 may lead to damage of the lens module 11 and cause considerable economic loss. In accordance with a concept of the present invention, since the binding material 18 still possess the fluidity before the binding material 18 is cured, the lens mount 12 is detached from the printed circuit board 13 prior to the curing process in order to remove the particles 9. Under this circumstance, it is easy to detach the lens mount 12 from the printed circuit board 13 without damaging the components. That is, according to the present invention, the testing process for detecting the clean condition of the close space 10 is done after the lens mount 12 and the printed circuit board 13 are releasably bound together due to the stickiness of the binding material 18 but before the binding material 18 is cured. If any particles present in the close space 10 are detected during the testing process, the lens mount 12 can be easily detached from the printed circuit board 13 because the components of the image capturing device 1 have not been securely bound together via the binding material 18. For removing the particles 9, a cleaning process is done. The cleaning process includes wiping off the particles 9 on the components that are located in the optical path of the imaging light (e.g. lens or the image sensor). In some embodiments, the cleaning process includes blowing off the particles 9 by dry ice or air. Alternatively, the cleaning process includes removing the particles by vacuum cleaning or adsorption. After the cleaning process, the tester may optionally replenish the binding material 18 if the binding material 18 is lost. If the amount of the binding material 18 is enough, the binding material 18 is applied onto the surface of the printed circuit board 13 such that the lens mount 12 and the printed circuit board 13 are releasably bound together. The testing process is performed again. If the result of the testing process assures that no particles are present, the curing process is done to cure the binding material 18.

Figure 4:
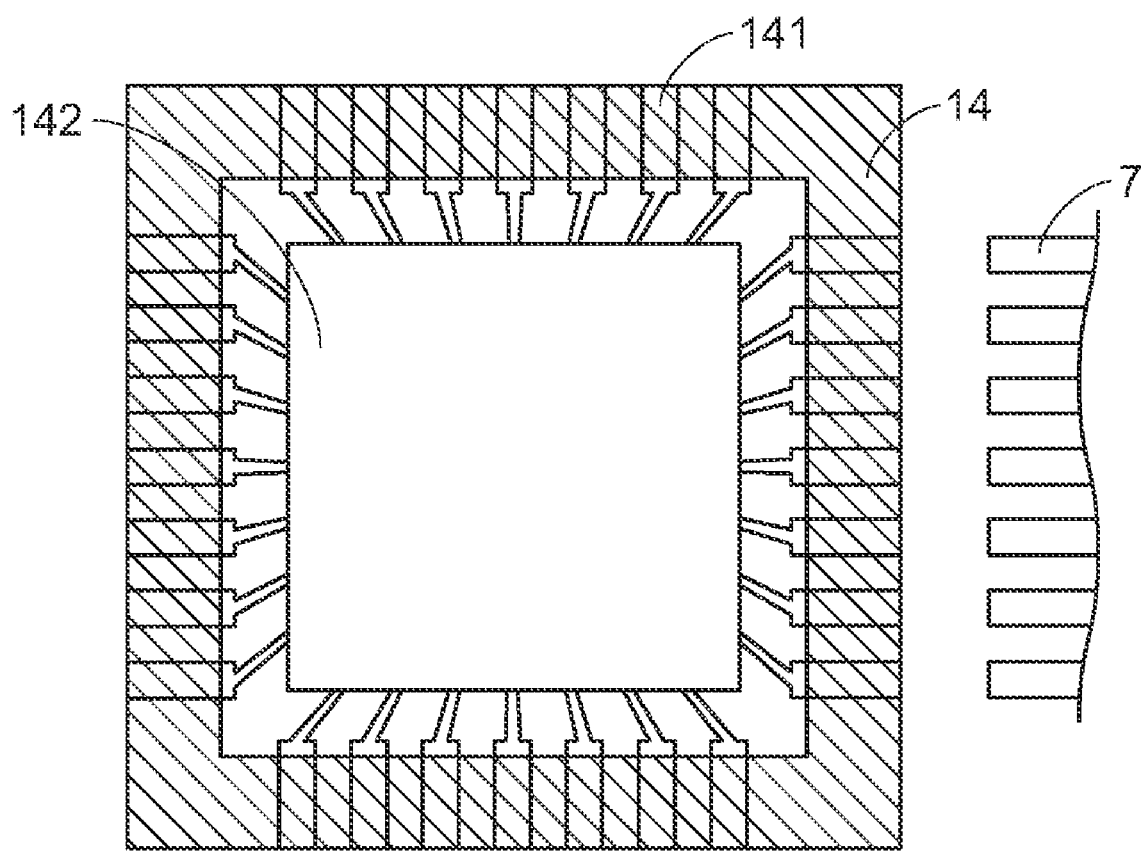
FIG. 4 is a schematic view illustrating the connection between an image sensor and a probe.

FIG. 4 is a schematic view illustrating the connection between an image sensor and a probe. After the probe 7 is electrically connected with the electrical contacts 141 on the periphery of the image sensor 14, the tester can detect whether there are particles adversely influencing the image quality according to the captured image. For testing the clean condition of the image capturing device 1, the probe 7 may be inserted into the socket 16 so as to be electrically connected with the electrical contacts 141 on the periphery of the image sensor 14. Alternatively, other electrical contacts (not shown) that are exposed outside the packaging structure but connected with the image sensor 14 may be employed to perform the testing process. In some embodiments, the clean condition of the image capturing device 1 is discriminated according to the image captured by the image sensor. Alternatively, the clean condition of the image capturing device 1 may be discriminated by using a microscope to detect the particles adversely influencing the image quality.

Figure 5:
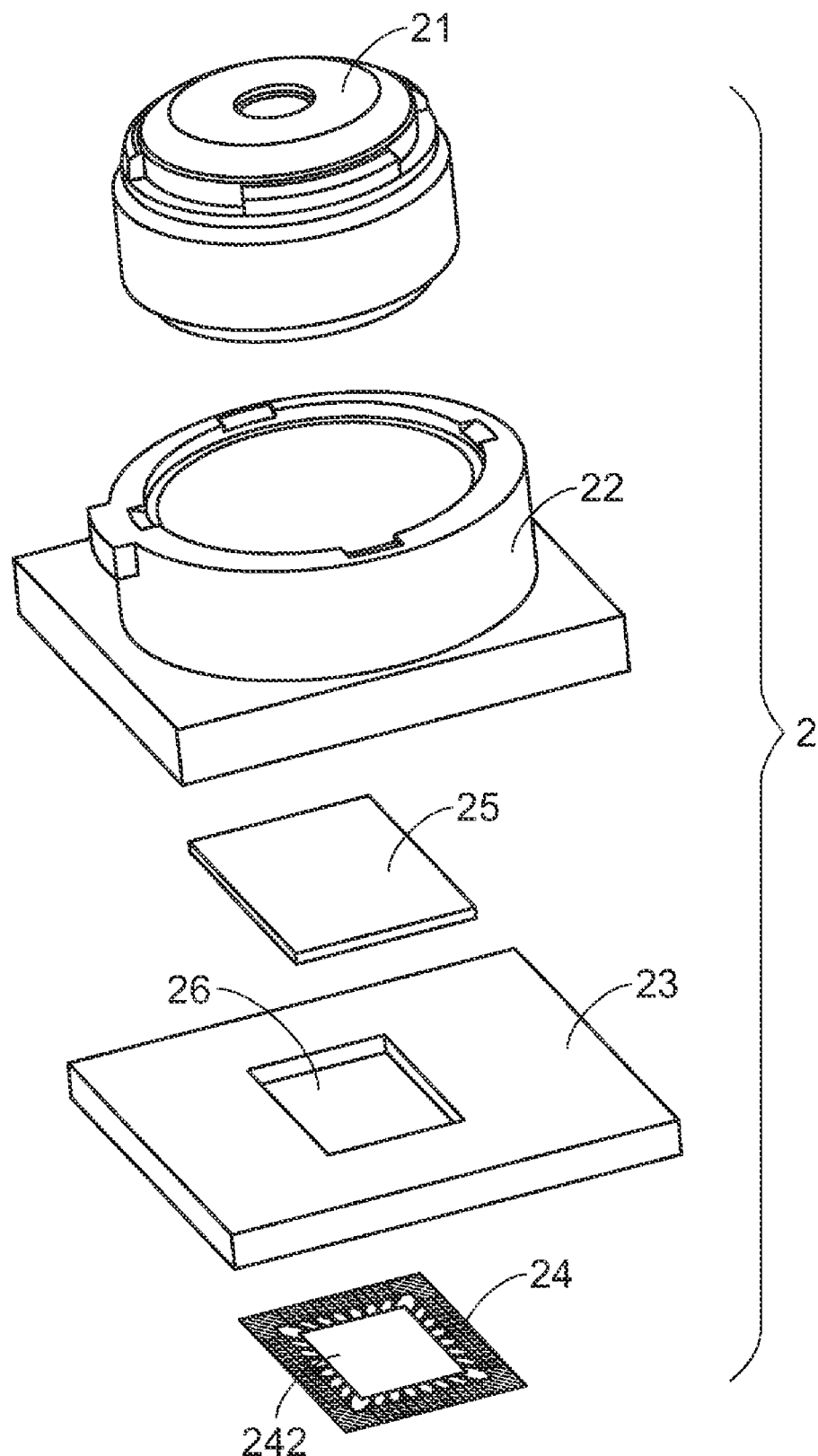
FIG. 5 is a schematic exploded view illustrating an image capturing device according to another embodiment of the present invention.

FIG. 5 is a schematic exploded view illustrating an image capturing device according to another embodiment of the present invention. The image capturing device 2 principally comprises a lens module 21, a lens mount 22, a printed circuit board 23 and an image sensor 24. The image sensor 24 has a light sensing region 242 in the center thereof. In comparison with the image capturing device 1, the printed circuit board 23 of the image capturing device 2 is arranged between the lens mount 22 and the image sensor 24. In addition, the printed circuit board 23 has a hollow region 26 in the center thereof. The hollow region 26 of the printed circuit board 23 is located in the optical path of the imaging light such that the imaging light can be focused on the image sensor 24 through the hollow region 26. In some embodiments, a transparent sheet-like element 25 is embedded in the hollow region 26. The transparent sheet-like element 25 is for example a plain glass having a protective function or an IR filter having a light filtering function.

Likewise, the testing process is done after the components of the image capturing device 2 but before the binding material is cured. If any particles present on the components that are located in the optical path of the imaging light are detected, a cleaning process is performed. Until the result of the testing process assures that no particles are present, the curing process is done to cure the binding material. In a case that the transparent sheet-like element 25 is exempted, the close space for enclosing the light sensing region 242 of the image sensor 24 is defined by the lens module 21, the lens mount 22 and the printed circuit board 23. Whereas, in another case that the transparent sheet-like element 25 is embedded in the hollow region 26, the transparent sheet-like element 25 and the lens module 21 are collectively referred as a light-pervious module of the image capturing device 2. In addition, the method for assembling the image capturing device 2 includes two assembling procedures. In the first assembling procedure, the light sensing region 242 of the image sensor 24 is packaged by applying the binding material on opposite surfaces of the printed circuit board 23 and at the peripheries of the hollow region 26. As such, the image sensor 24, the transparent sheet-like element 25 and the printed circuit board 23 are releasably bound together via the binding material, wherein the light sensing region 242 of the image sensor 24 is aligned with the hollow region 26. In other words, the light sensing region 242 of the image sensor 24 is enclose in the close space defined by the image sensor 24 (e.g. a CCD chip or a CMOS chip), the printed circuit board 23 and the transparent sheet-like element 25. In accordance with a key feature of the present invention, the testing process is done after the image sensor 24, the transparent sheet-like element 25 and the printed circuit board 23 are releasably bound together via the binding material but before the binding material is cured. If any particles present in the close space are detected during the testing process, the image sensor 24 or the transparent sheet-like element 25 can be easily detached from the printed circuit board 23. Next, a cleaning process is performed to clean the transparent sheet-like element 25 and the light sensing region 242 of the image sensor 24. Until the result of the testing process assures that no particles are present, the curing process is done to cure the binding material. In some embodiments, the binding material between one of the image sensor 24 and the transparent sheet-like element 25 and the printed circuit board 23 is cured; but before the binding material between the other one of the image sensor 24 and the transparent sheet-like element 25 is cured, the testing process and the cleaning process are implemented. In the second assembling procedure, the lens mount 22, the lens module 21 are releasably bound with the printed circuit board 23, so that another close space located in the optical path of the imaging light is defined by the printed circuit board 23, the lens mount 22 and the lens module 21. Likewise, the testing process is done after the lens mount 22 and printed circuit board are releasably bound together via the binding material but before the binding material is cured. If any particles present in the close space are detected during the testing process, a cleaning process may be done.

The above two assembling procedures can be individually or simultaneously performed. In addition, the binding materials used for binding different components together may be identical or different. It is noted that, however, those skilled in the art will readily observe that numerous modifications and alterations may be made while retaining the teachings of the invention.

Figure 6:
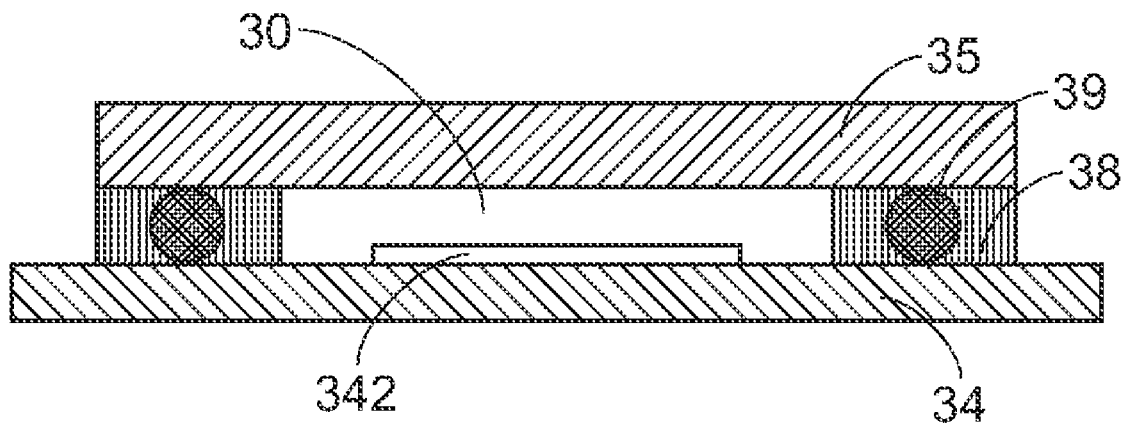
FIG. 6 is schematic cross-sectional view illustrating a structure of packaging an image sensor with a transparent sheet-like element.

In the above embodiment, the transparent sheet-like element is embedded in the hollow region of the printed circuit board. The transparent sheet-like element may be directly mounted over the light sensing region of the image sensor. FIG. 6 is schematic cross-sectional view illustrating a structure of packaging an image sensor with a transparent sheet-like element. As shown in FIG. 6, the image sensor 34 and the transparent sheet-like element 35 are releasably bound together via a fixing adhesive 38. The transparent sheet-like element 35 is for example a plain glass having a protective function or an IR filter having a light filtering function. The image sensor 34 has a light sensing region 342 in the center thereof. An example of the image sensor 34 is a CCD chip or a CMOS chip. Multiple micro lenses (not shown) are disposed on the light sensing region 342 such that the light sensing region 342 is higher than the surface of the image sensor 34 (e.g. a CCD chip) by for example 5 μm. For preventing direct contact between the transparent sheet-like element 35 and the light sensing region 342, some supporting granules 39 are added into the fixing adhesive 38. The diameter of the fixing adhesive 38 is higher than the height of the light sensing region 342 protruded from the surface of the image sensor 34, so that the transparent sheet-like element 35 is uplifted and a close space 30 between the image sensor 34 and the transparent sheet-like element 35 is formed. For example, if the height of the light sensing region 342 protruded from the surface of the image sensor 34 is 5 μm and the diameter of the fixing adhesive 38 is 30 μm, the gap between the transparent sheet-like element 35 and the light sensing region 342 is 25 μm. As such, an image sensor package structure 3 is assembled. Furthermore, the image sensor package structure 3 may be assembled with other components such as the lens module or the printed circuit board. In some embodiments, the printed circuit board is replaced by a chip-on-glass (COG) and thus the printed circuit board is exempted. In the chip-on-glass configuration, the trace patterns originally formed on the printed circuit board are formed on the glass plate (e.g. the transparent sheet-like element 35) where the chip (e.g. the image sensor 34) is attached. The concept of the present invention is also applicable to the method of assembling the image sensor package structure 3.

Likewise, the testing process is done after the image sensor 34 and the transparent sheet-like element 35 are releasably bound together but before the fixing adhesive 38 is cured. If any particles present in the close space 30 are detected during the testing process, a cleaning process may be done.

In some embodiments, the transparent sheet-like element is arranged on the lens mount 12 of the image capturing device 1, so that a close space is defined between the transparent sheet-like element (not shown), the lens mount 12 and the printed circuit board 13. Likewise, the testing process is done after the transparent sheet-like element and the lens mount 12 and the printed circuit board 13 are releasably bound together via the binding material 18 but before the binding material 18 is cured. In some embodiments, the transparent sheet-like element is arranged on the bottom of the lens barrel 111 of the lens module 11. After the lens barrel 111 is detached from the lens mount 12, the particles on the light sensing region 142 can be removed. The cleaning process is relatively time-consuming. In addition, the foreign dust or the crumbs resulted from friction between the lens barrel 111 and the lens mount 12 may drop into the image capturing device 1. In other words, such an assembling method needs to be further improved.

Figure 7:
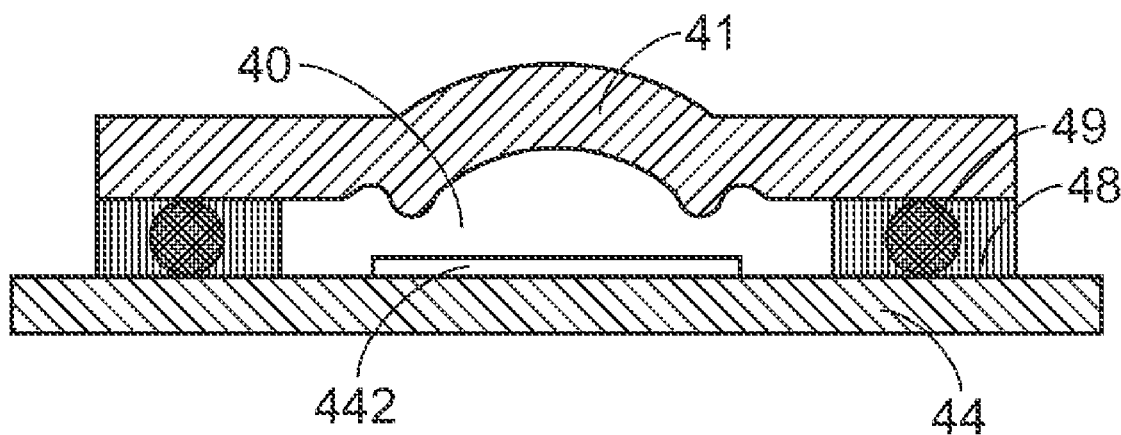
FIG. 7 is a schematic cross-sectional view illustrating an image capturing device packaged according to a lens-on-chip technology.

As known, the printed circuit board, the lens barrel and the lens mount of the lens module are not necessary for some camera modules or image capturing devices. FIG. 7 is a schematic cross-sectional view illustrating an image capturing device packaged according to a lens-on-chip technology. In the image capturing device 4, a lens or lens set 41 is directly attached on an image sensor 44 (e.g. a CCD chip or a CMOS chip) so as to assemble a camera module. Likewise, the light sensing region 442 of the image sensor 44 is higher than the surface of the image sensor 44 (e.g. a CCD chip). For preventing direct contact between the lens 41 and the image sensor 44, some supporting granules 49 are added into the fixing adhesive 48. The diameter of the fixing adhesive 48 is higher than the height of the light sensing region 442 protruded from the surface of the image sensor 44, so that the lens 41 is uplifted and a close space 40 between the image sensor 44 and the lens set is formed. In a case that the lens 4 is formed of plastic or molding glass, some supporting posts (not shown) may be extended from the periphery of the lens 41, so that a close space 40 between the image sensor 44 and the lens set is formed. Under this circumstance, the supporting granules 49 are replaced by the supporting posts. Likewise, the testing process is done after the lens 41 and the image sensor 44 are releasably bound together but before the fixing adhesive 48 is cured. If any particles present in the close space 40 are detected during the testing process, a cleaning process may be done.

In some embodiments, the peripheries of the image sensors 34 and 44 as shown in FIGS. 6 and 7 are not covered by the packaging structures such that the electrical contacts (not shown) are exposed outside the packaging structure to be connected with external circuitry. By connecting the probe with the electrical contacts (as shown in FIG. 4), the clean condition of the image sensor package structure 3 or the image capturing device 4 can be tested.

Statistically, it is found that approximately seventy to eighty percent of damage rate is resulted from particles during the process of producing, transporting or assembling the image capturing device. In addition, the testing process for detecting the particles is labor-intensive and costly. The secondary damage resulted from removal of the particles become troublesome. In accordance with a concept of the present invention, the testing process for detecting particles is performed before the binding material 18 is cured, and thus the cleaning process is simplified. Under this circumstance, the possibility of damaging the components of the image capturing device is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for assembling a camera module, said camera module including an image sensor and a lens module, said method comprising steps of:
    releasably binding said image sensor and said lens module together via a fixing adhesive, wherein said fixing adhesive is curable by a curing process;
    detecting whether there are particles present between said image sensor and said lens module, wherein if particles present between said image sensor and said lens module are detected, said method includes sub-steps of:
        detaching said image sensor and said lens module from each other;
        cleaning said image sensor and said lens module; and
        releasably binding said image sensor and said lens module together again; and
    curing said fixing adhesive if no particles are present between said image sensor and said lens module.

2. The method according to claim 1 wherein said lens module includes at least one lens, and said image sensor is a CCD chip.

3. The method according to claim 2 wherein said step of connecting said image sensor and said lens module together includes releasably binding said at least one lens on said image sensor via said fixing adhesive.

4. The method according to claim 2 wherein said camera module further includes a circuit board.

5. The method according to claim 4 wherein said step of connecting said image sensor and said lens module together includes sub-steps of:
    mounting said image sensor on said circuit board; and
    fixing said lens module on said circuit board.

6. The method according to claim 5 wherein said camera module further includes a lens mount, and said step of fixing said lens module on said circuit board includes sub-steps of:
    mounting said lens module on said lens mount; and
    releasably binding said lens mount on said circuit board via said fixing adhesive.

7. The method according to claim 1 wherein said camera module further includes a transparent sheet-like element disposed between said image sensor and said lens module, and said step of cleaning said image sensor and said lens module includes cleaning said transparent sheet-like element.

* * * * *